United States Patent
Chen

(10) Patent No.: US 6,349,307 B1
(45) Date of Patent: Feb. 19, 2002

(54) COOPERATIVE TOPICAL SERVERS WITH AUTOMATIC PREFILTERING AND ROUTING

(75) Inventor: Doreen Y. Chen, Los Altos, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/221,951

(22) Filed: Dec. 28, 1998

(51) Int. Cl.$^7$ .............................................. G06F 17/00
(52) U.S. Cl. ....................... 707/103; 707/3; 707/4; 707/5; 707/10; 707/102; 707/104.1; 709/218; 709/219; 709/229
(58) Field of Search ............................... 707/103, 3, 5, 707/6, 104, 7, 9, 10; 709/500, 501, 218, 219

(56) References Cited

U.S. PATENT DOCUMENTS

| | | | |
|---|---|---|---|
| 5,659,766 A | * 8/1997 | Saund et al. | 395/759 |
| 5,687,364 A | * 11/1997 | Saund et al. | 395/605 |
| 5,899,995 A | * 5/1999 | Miller et al. | 707/102 |
| 5,953,718 A | * 9/1999 | Wilcal | 707/5 |
| 5,991,756 A | * 11/1999 | Wu | 707/3 |
| 6,067,539 A | * 5/2000 | Cohen | 707/2 |
| 6,101,503 A | * 8/2000 | Cooper et al. | 707/104 |
| 6,154,213 A | * 11/2000 | Rennison et al. | 345/356 |

OTHER PUBLICATIONS

"Multimedia Production and Distribution System", Mornar et al., Proc. 17$^{th}$ Int. Conf. on 'Information Technology Interfaces', Jun. 1995, pp. 501–506, XP000904828.

"Document Categorization Using Lexical Analysis and Fuzzy Sets", IBM Corp., vol. 35, No. 1A, Jun. 1992, p. 434, XP000308928.

"Using IR Techniques for Text Classification in Document Analysis", Hoch, Proc. of the Annual International ACM-Sigir Conf. on Research and Development in Information Retrieval, 1994, pp. 31–40, XP000475312.

"Classification and Retrieval of Documents Using Office Organization Knowledge", Celentano et al, Proc. of the Conf. on Organization al Computing Systems, 1991, pp. 159–164, XP00313807.

"Hierarchical Bayesian Clustering for Automatic Text Classification", Iwayama et al, Proc. of the International Joint Conf. on Artificial Intelligence, Aug. 1995, pp. 1332–1333, XP002116465.

* cited by examiner

Primary Examiner—Thomas Black
Assistant Examiner—Jacques Veillard
(74) Attorney, Agent, or Firm—Peter Verdonk

(57) ABSTRACT

An information organization and retrieval system that efficiently organizes documents for rapid and efficient search and retrieval based upon topical content is presented. The information organization and retrieval system is optimized for the organization and retrieval of only those documents that are relevant to a given set of predefined topics. If a document does not have a topic that is included in the given set of topics, the document is excluded from the provided service. In like manner, if a document includes a topic that is specifically banned from the provided service, it is excluded. In this paradigm, the provider purposely limits the scope of the provided search and retrieval services, but in so doing provides a more efficient and effective service that is targeted to an expected user demand. The information organization and retrieval system also supports context-sensitive search and retrieval techniques, including the use of predefined or user-defined views for augmenting the search criteria, as well as the use of user specific vocabularies. In a preferred embodiment, the select set of topics are organized in multiple overlapping hierarchies, and a distributed software architecture is used to support the topic-based information organization, routing, and retrieval services. Documents may be relevant to one or more topics, and will be associated with each topic via the topical hierarchies that are maintained by the information servers.

16 Claims, 3 Drawing Sheets

COOPERATIVE TOPICAL SERVERS WITH AUTOMATIC PREFILTERING AND ROUTING

BACKGROUND OF THE INVENTION

1. Field of the Invention

This invention relates to the field of data processing and communications, and in particular to the field of document storage, organization, and retrieval.

2. Description of Related Art

The volume of information that is available for access continues to increase, and the rate of increase in volume also continues to increase. This continually increasing information growth has led to increasingly expanding resources for information storage, organization and retrieval.

Conventional search engines, such as those used for finding documents on the World Wide Web, use a variety of techniques to quickly locate documents in response to a user query. One such technique is the creation of a database of indexes corresponding to the documents on the web. A user's request is processed by finding a correlation between the user's request and the information contained in the index database, rather than by actually searching the web in response to each user request. Conventional search engines use "crawlers" that locate new or updated documents. When a new or updated document is located, the search engine creates an index corresponding to that document that contains, for example, a list of the most commonly occurring words or phrases in the document. Alternatively, techniques are available that allow the creator of the document to augment the document with a set of keywords or phrases directly, and these keywords or phrases are used to index the document. For ease of reference, the term keyword is used hereinafter to mean a word that is contained in an index to a document, regardless of the methods used to place that word in the index. When a user enters a query, the search results are based upon a matching between the words contained in the user query and the keywords contained in the indexes to the documents. As would be evident to one of ordinary skill in the art, the size of an index to a document can be large, and a database of indexes to virtually all of the documents on the web will be extremely large and will continue to grow at an increasing rate of growth. In 1998, an estimated 1.5 million pages are added to the World-Wide-Web per day, and this daily rate is expected to continue to increase. In addition to the cost of increased storage resources, the performance of database search techniques degrade as the size of the database increases.

Document retrieval based upon a keyword search is becoming increasingly less efficient and less effective as the number of documents that may contain the keyword continues to increase. It is not uncommon for a keyword search on the World Wide Web to return thousands of documents that are related to the keyword, many of which are irrelevant to the user's quest. To reduce the number of identified documents corresponding to the keyword search, a user must augment the search parameters with additional keywords or phrases. In so doing, however, documents that are relevant to the user's quest may be excluded from the search results if the user does not choose the same words that are used in the document. A search engine could be enhanced to automatically augment a user's query with synonymous keywords to avoid this problem, but such an augmentation will aggravate the problem of identifying documents that contain the words but are irrelevant to the user's quest.

Topical categorizations provide a more selective means of locating documents that are relevant to a user's quest, because documents that have the same topic as the user's quest are more likely to have relevant information than documents that merely contain a collection of matching words. Identifying a document's topic, or topics, however, is a more complex task than identifying the words that are contained in the document. Traditionally, topic identification is a manually intensive task, requiring a large staff of people to read and categorize each document. Advances are continually being made in the information sciences in the development of statistically based algorithms, neural net and genetic based algorithms, and the like for automatic categorization of documents. Topical categorization also provides a highly effective means for general browsing, by allowing a user to select both topics of interest and topics of disinterest to steer the browsing process.

The techniques used to organize, store, and retrieve documents based on keyword searches, however, are not necessarily optimal or desirable for documents that can be categorized by topic. A mere replacement of topic phrases for keywords in a keyword search engine may not provide the improvements in search and storage efficiencies required as the quantity of available information continues to increase. The traditional approach of creating larger and larger search engines and databases that index every available document on the web based upon a frequency of occurrences of words or phrases within each document may be wholly inefficient and ineffective for organizing and retrieving documents based on topic. An indiscriminate use of topic determining techniques, for example, may merely create an even larger vocabulary that a user must use to filter relevant documents, with the inherent risk of choosing a different set of words or phrases than those used to index the documents. Because most documents contain multiple topics, the addition of topic information to existing indexes of documents will also substantially increase the size of the database required to contain this additional information.

BRIEF SUMMARY OF THE INVENTION

It is an object of this invention to provide an information organization and retrieval system that efficiently organizes documents for rapid and efficient search and retrieval based upon topical content. It is a further object of this invention to provide an information organization and retrieval system that can be enhanced incrementally. It is a further object of this invention to provide an information organization and retrieval system that supports context-sensitive search and retrieval techniques. It is a further object of this invention to provide an information and retrieval system that allows a user to employ a vocabulary that may differ from the vocabulary used to organize the information in the information organization and retrieval system.

These objects and others are achieved by providing an information organization and retrieval system that is optimized for the retrieval of only those documents that are relevant to a given set of topics. The invention provides a method and apparatus for automatic document prefiltering and routing via a network of cooperating topical information servers. The information servers are provided to support document organization and retrieval based upon a select set of topics. The select set of topics are organized in multiple overlapping hierarchies, and a distributed software architecture is used to support the topic-based information organization, routing, and retrieval services. Documents are automatically prefiltered to determine whether they are relevant to the select set of topics, and only relevant documents are identified for subsequent retrieval. Documents may be relevant to one or more topics, and will be associated with each topic via the topical hierarchies that are maintained by the information servers.

In a preferred embodiment, the retrieval process is enhanced by providing a method and apparatus that supports the use of predefined or user-defined views for augmenting the search criteria based upon the context within which the user is searching.

The organization and retrieval process in this invention is also enhanced through the use of an internally consistent topic vocabulary. Terms and phrases used by the authors of documents or by the user who is searching for documents are translated into this common internal vocabulary, thereby providing for an enhanced organization and search capability while still allowing for alternative choices of words and phrases.

BRIEF DESCRIPTION OF THE DRAWINGS

The invention is explained in further detail, and by way of example, with reference to the accompanying drawings wherein.

DETAILED DESCRIPTION OF THE INVENTION

In accordance with this invention, documents are categorized and organized by topics. A network of individual servers is provided for identifying and accessing the documents. By design, each respective server serves a respective select set of one or more topics. The topics are selected by the provider of the service network, based, for example, on an expected user demand for certain topic areas. As each new topic is identified for inclusion, it is added to an existing server, or to another server that is added to the network. In this manner, the range of topics is controlled, yet scalable by an incremental addition of servers to the network. If a document does not have a topic that is included in the network set of topics, the document is excluded from the provided service. In like manner, if a document includes a topic that is specifically banned from the provided service, it is excluded. In this paradigm, the provider purposely limits the scope of the provided search and retrieval services, but in so doing provides a more efficient and effective service that is targeted to an expected user demand. As demand increases, additional topics and servers can be provided, thereby allowing for an incremental scalability of the provided service.

Figure 1:
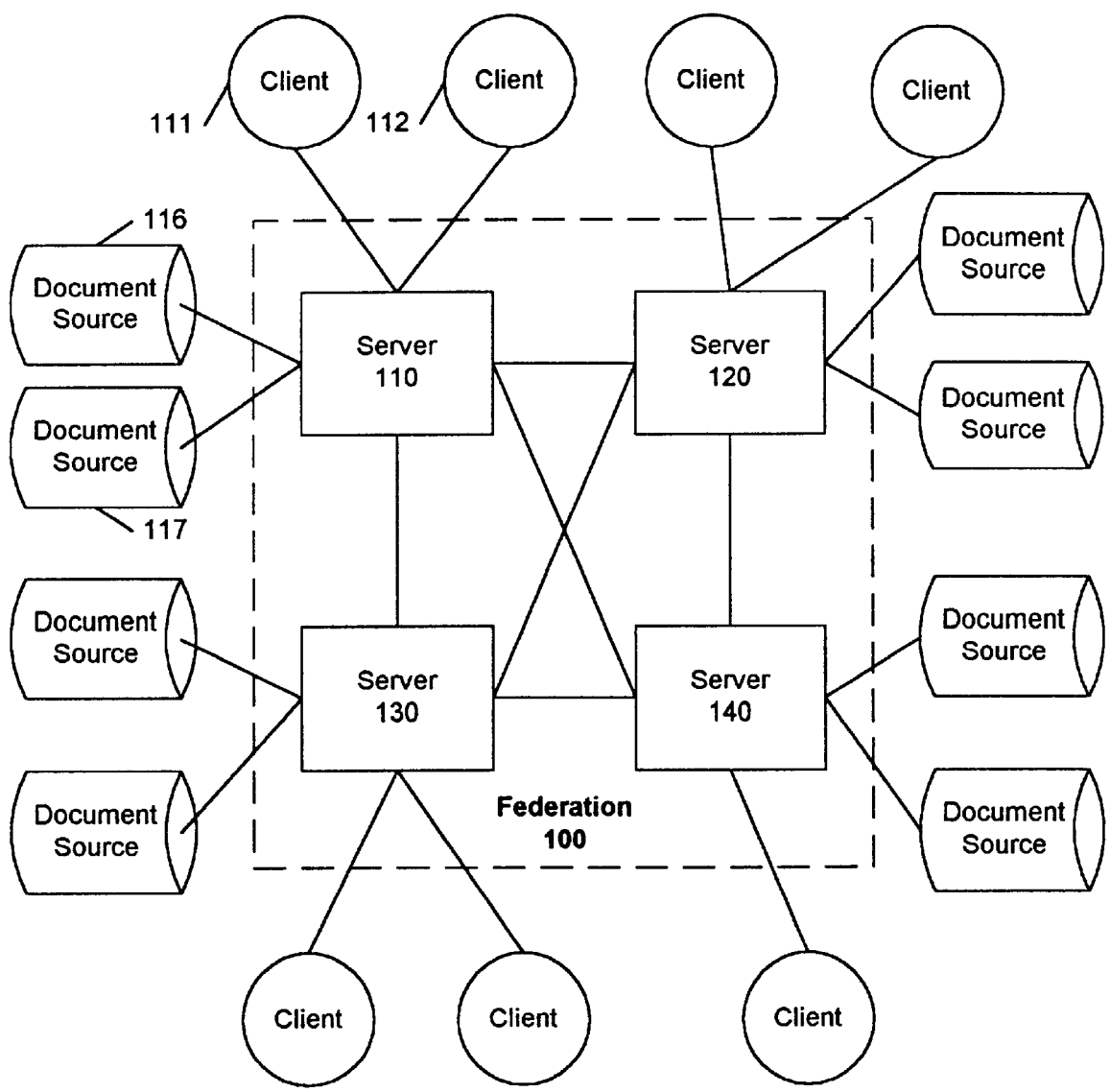
FIG. 1 illustrates an example block diagram of an information processing system in accordance with this invention.

FIG. 1 illustrates an example information processing system in accordance with this invention. The information processing system 100 includes a network of topical servers 110, 120, 130, 140. For convenience, the network of topical servers is termed a federation 100. Each topical server serves a select set of topics, and the collection of the sets of topics of the servers within the federation is termed the federation topics. Documents that are found to be relevant to a topic are associated to that topic within the topical server containing that topic. By providing a network of servers, each serving a select set of topics, the workload associated for organizing and searching for documents is distributed among the servers.

In a preferred embodiment, to further share the workload, each server also serves assigned clients, and assigned document sources. Illustrated in FIG. 1, topical server 110 has assigned clients 111, 112, and assigned document sources 116, 117. The assigned clients 111, 112 are, for example, web browsers that are used by users (not shown) to interact with the system 100. The document sources 116, 117 are, for example, storage facilities on the world wide web. For ease of understanding, the term document is used herein to reference a block of information, such as one or more pages of text, as well as information in other forms, such as video and audio clips, pictures, drawings, computer programs, and the like.

Consistent with traditional search engines, the topical server 110 periodically sends crawlers to the document sources 116, 117 to gather new or updated documents. The server 110 scans the documents found by its crawlers and determines the topics contained in each document. In contrast to the traditional search engines, the server 100 selects the document for identification only if one or more of the document topics are included in the federation topics. As discussed below, the topics may be determined by automated means, using for example semantic processing, heuristics, knowledge based systems, machine learning, and the like. The topics may also be determined based upon information that is ancillary to the document. For example, video 'documents' may have an associated abstract, audio 'documents' may be stored in the document source 116, 117 according to style or artist, and so on. In like manner, the results of a manual topic determination could be stored with the document, and used by the topical server 110 to determine the topic of the document for use in this system 100. As would be evident to one of ordinary skill in the art, and as discussed below, because the topics of potential interest are predefined, the ability to determine whether a document is relevant to each topic is greatly enhanced, as compared to a blind search for all possible topics that the document might address. The server 110 communicates an identifier corresponding to the document, and the document topics, to any other server 120, 130, 140 in the federation that includes one or more of the document topics. As would be evident to one of ordinary skill in the art, the storage of a document identifier associated with each topic of a predetermined set of federation topics can be expected to consume significantly fewer resources than the storage of the aforementioned general index of keywords and the like for the document in a traditional search engine.

Figure 2:
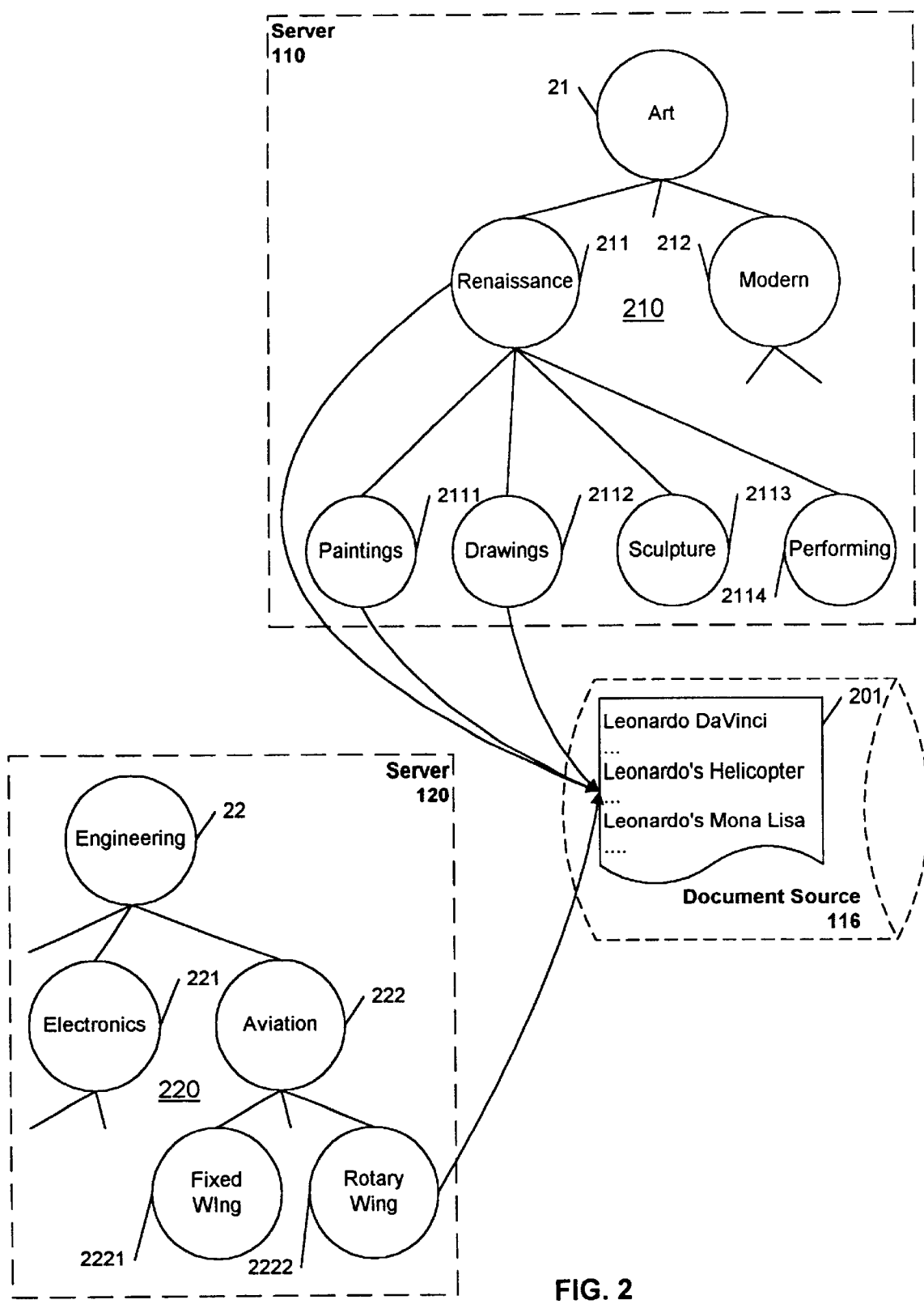
FIG. 2 illustrates an example association of a document to multiple topic nodes in an information processing system in accordance with this invention.

The document base is formed by associating the document with each of the federation topics that it contains. Each server organizes the document, via the document identifier, according to the topics covered by that server. In a preferred embodiment, topics are organized as nodes in trees, with more general concepts toward the root nodes and more specific topics toward the leaf nodes. A selected document is linked to one or more topic nodes, and each topic node points to zero or more documents. An example tree structure corresponding to a tree 210 within server 110 and a tree 220 within server 120 is illustrated in FIG. 2. The tree 210 is a hierarchical tree relating to art, and the tree 220 is a hierarchical tree relating to engineering. The general topic of art 21 is illustrated as having more specific branch nodes of Renaissance 211 and Modern 212. Consistent with conventional tree terminology, the full names of branches Renaissance 211 and Modern 212 are art.renaissance 211 and art.modern 212. The art.renaissance node 211 includes branches of art.renaissance.paintings 2111, art.renaissance.drawings 2112, art.renaissance.sculpture 2113, and art.renaissance.performing 2114. In like manner, the engineering node 22 includes branches engineering.electronics 221 and engineering.aviation 222. The engineering.aviation node 222 includes branches engineering.aviation.fixed wing 2221 and engineering.aviation.rotary-wing 2222.

In the example of FIG. 2, the crawler of server 110 has located a document 201 in document source 116. The document 201 is illustrated as including information related to Leonardo DaVinci, Leonardo's drawing of a helicopter, and Leonardo's painting of the Mona Lisa. Based upon the content of document 201, the server 110 extracts the document topics from document 201, including the topics of art.renaissance (relating to Leonardo DaVinci), art.renaissance.paintings (relating to the Mona Lisa), art.renaissance.drawings (relating to the helicopter), and engineering.aviation.rotary-wing (also relating to the helicopter). Note that, because the topics are predefined, the server 110 can be structured to optimize the topic extraction process. For example, each topic may have an associated set of keywords and phrases, and the determination of whether a document is relevant to a particular topic can be based upon a conventional weighting or thresholding procedure based upon the occurrences of these keywords and phrases in the document. In a preferred embodiment, the conventional techniques are enhanced by heuristics based on the location of a phrase in particular areas of the document, such as the title, or the type of font (bold, italic, etc.) used to display the phrase, the presence of a word or phrase in a meta-tag, and so on. The use of predefined topics also facilitates the use of improved categorization techniques. For example, in a preferred embodiment, machine learning techniques are applied to enhance the server's ability to correctly identify topics within a document. Typically, the determination of whether a given topic is included in a document is based upon a number of independent and dependent decisions. In a training mode, the topic extractor of each node is provided feedback regarding its accuracy in determining each topic. This feedback is used to adjust the topic extractor's subsequent determinations, using for example a Bayesian network that adjusts a likelihood factor associated with each decision component, based upon the accuracy of each determination. Correct determinations increase the likelihood factors associated with each decision component, while incorrect determinations decrease the factors. In like manner, machine learning techniques can be applied to create or modify the hierarchical classifications of topics, based upon observed clusterings of document topics and other factors. These and other techniques for organizing and categorizing information, such as knowledge based systems, machine learning, fuzzy logic, and the like, are common in the art.

In a preferred embodiment, the server 110 identifies each of the federation topics that are included in each document that is located by its crawler. Alternatively, because each server can be optimized for the extraction of each of its selected topics, the federation 100 can be structured such that each document that is located by each crawler is processed by each server independently. In the example preferred embodiment of FIG. 2, the server 110 communicates an identifier of the document 201 to the server 120, with a notice that the document 201 includes the engineering.aviation.rotary-wing topic. The identifier of the document 201 could be, for example, the web address corresponding to the document 201, or any other identifier that uniquely identifies document 201. In accordance with this invention, the document 201 is linked to each of the corresponding nodes 211, 2111, 2112 and 2222 of the trees 210 and 220, for example by adding the identifier of the document 201 to a list of relevant documents at each node.

A conventional tree structure is illustrated in FIG. 2. Other data organization structures, common in the art, may be used as well. In a preferred embodiment, a hierarchical structure, such as a tree, is preferred, because it allows for search techniques that have been found to be commensurate with the way that humans organize information. Overlapping, or "tangled" tree structures are employed in a preferred embodiment to allow a user to arrive at a given node via a variety of search paths. For example, a tree that includes physics topics may have a physics.flight.helicopters topic node that corresponds to the same node as the aforementioned engineering.aviation.rotary-wing topic node. In like manner, links among sibling nodes are also provided in a preferred embodiment, allowing for example, an association between the Renaissance drawings 2111 and paintings 2112 nodes of FIG. 2.

Figure 3:
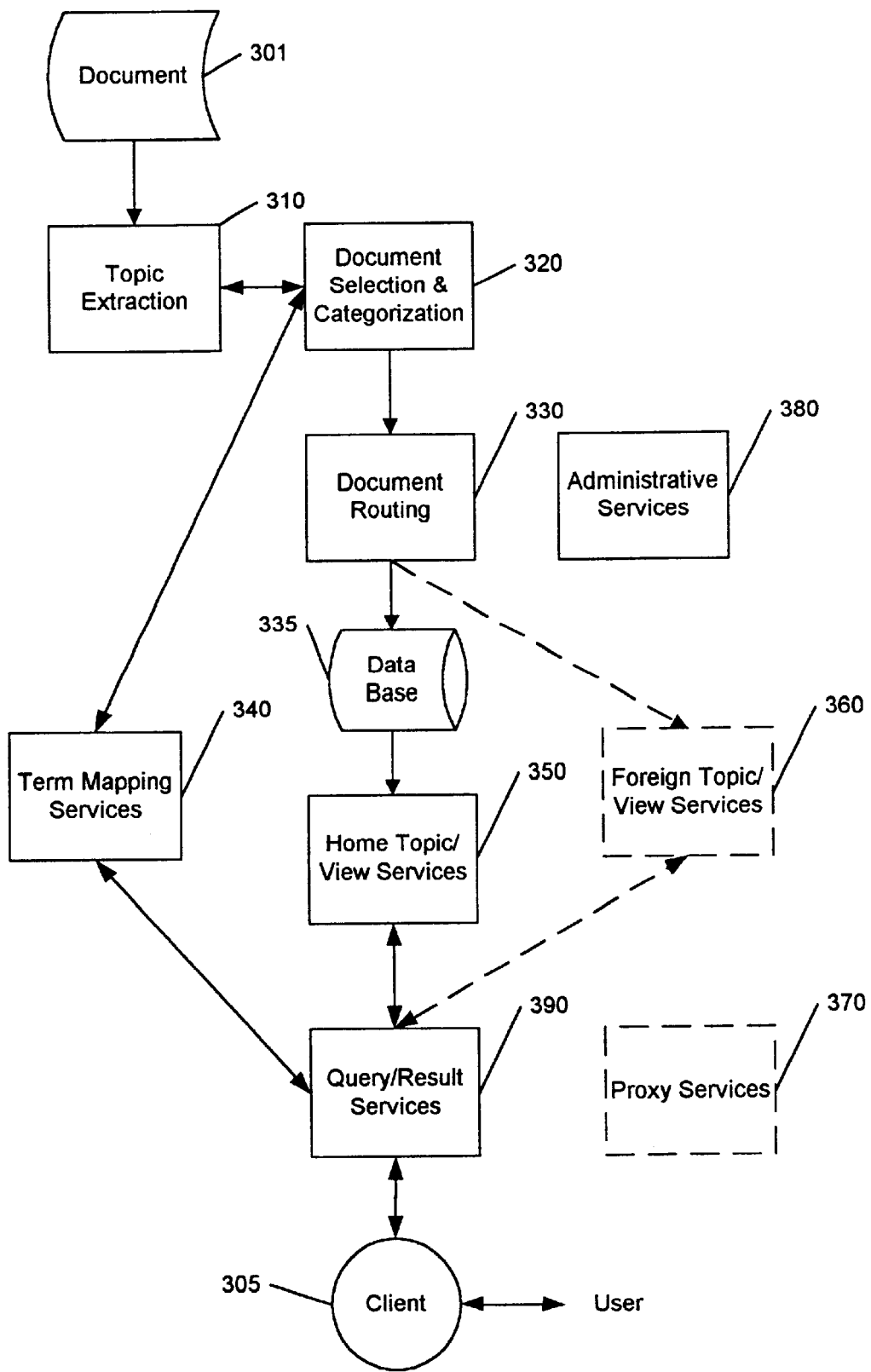
FIG. 3 illustrates an example flow diagram for organizing, searching, and retrieving documents via an information processing system in accordance with this invention.

FIG. 3 illustrates an example flow diagram of an information processing system in accordance with this invention. This flow diagram illustrates, for example, the resources provided by a service provider to enable the organization, identification, and retrieval of documents based upon topical content, and the flow of data among these components. In a preferred embodiment, each of the functional blocks of FIG. 3 are contained in each server, for efficiency, although they could be distributed throughout the federation. The topic-extraction module 310 extracts topical words and phrases from a document 301. The topic-extraction module 310 performs this task in conjunction with the document-selection-and-categorization module 320 that enhances the extraction process based upon the use of predefined topics, as discussed above. A term-mapping-services module 340 augments this process by performing such services as translating extracted terms and phrases into terms and phrases used within the federation. For example, the term "helicopter" may be converted to "rotary-wing aircraft" to facilitate a determination of whether a document that contains the word "helicopter" is relevant to the topics that have been formulated using the term "rotary-wing aircraft" instead of "helicopter". Because selected topics are used, the proper recognition of synonymous terms and phrases can be substantially improved as compared to a topic-independent translation.

If the topic-extraction module 310 is able to identify a federation topic within the document 301, the document 301 is selected and categorized by the document-selection-and-categorization module 320, and the document identification and topics are forwarded to the document-routing module 330. The document-routing module 330 forwards this information to the database 335 for the identified document topics that are local to the federation. The database 335 contains the topic-based data structured discussed above with respect to FIG. 2. In a preferred embodiment, the database 335 is distributed throughout the federation based upon the topics associated with each server. Also, as stated above, in a preferred embodiment, each of the servers comprise the blocks illustrated in FIG. 3. For ease of reference, the term "host-server" is used to identify the server that contains a given block. The document-routing module 330 updates the database 335 directly for each of the topics that are associated with the its host-server, and communicates the document identification and topics to a corresponding document-routing module at each of the other servers that contain one or more of the document topics. Each of these other document-routing modules update the database 335 for their corresponding host-server topics.

Correspondingly, the document-routing module 330 is configured to receive document identifications and topics from other servers, and updates the database 335 directly for each of the received topics that are associated with its host-server. That is, for example, if the document-routing module 330 is located on the server 120 of FIG. 2, the document-routing module 330 updates the database associated with the server 120 with all document identifiers related to engineering 22, and communicates the document identifiers and topics to a document-routing module at server 110 whenever the document topics include art 21. In similar manner, the document-routing module at server 110 communicates document identifiers and topics to the document-routing module 330 in server 120 whenever one of its found documents contain a topic related to engineering 22.

Illustrated in FIG. 3 are an optional foreign-federation module 360 and an optional proxy-services module 370, that facilitate a combination of multiple federations within the information processing system. In a preferred embodiment, multiple federations are used to provide a degree of specialization within each federation. Interrelated topics are placed within one federation, while less related topics are place in other federations. In this manner, each federation may be customized and scaled in response to user feedback to provide highly efficient retrieval within the federation's field of specialization. Multiple-federation proxy services are also used to access the resources of other providers, so as to allow a service provider to provide a wider breadth of topics to its clients without requiring the service provider to categorize all documents within this wider breadth of topics. The proxy services module 370 regulates the degree of access to its home federation resources. For example, among federations of the same provider, document identifiers and topics from one federation will be forwarded to the other federations whenever the topics include one or more of the topics of the other federations. Among federations of different providers, however, the proxy services module 370 may allow search and retrieval by a foreign-federation, but may prevent the communication to the foreign-federation of the document identifiers and topics that are determined by any document-selection-and-categorization modules 320 within the home-federation.

In a preferred embodiment, a server within each federation of a multiple-federation configuration is used as a proxy server to interface with corresponding proxy servers of other federations. The proxy server summarizes the information related to its federation, and uses the proxy-services module 370 to communicate this information to other federations, as appropriate, and to receive the information related to the other federations from their respective proxy servers. The proxy-services module 370 also effects the updating of the term-mapping-services module 340 and document-selection-and-categorization module 320 to facilitate the identification and selection of the foreign-federation topics in the document 301. If the document 301 is found to contain a foreign-federation topic, the document-routing module 330 forwards the document identification and topic(s) to the foreign-federation-topic/view-services module 360. If permitted by the proxy-services module 370, as discussed above, the foreign-federation-topic/view-services module 360 provides the document identifier and topic(s) to each foreign-federation that contains one or more of the document topics.

The administrative-services module 380 provides the services required to manage the information processing system, including the creation and modification of topics, the addition and removal of servers, the establishment of proxy servers, and the like.

FIG. 3 also illustrates an example flow for document search and retrieval. A user interacts with the system via a client device 305. User queries are processed by the query/result-services module 390 to determine a search topic. As with the document section and categorization 320 process, the term-mapping-services module 340 facilitates the query process by transforming and augmenting the user query with the terminology used within the information processing system. Because of the use of predefined topics, the query/result-services module 390 in a preferred embodiment is able to optimize the determination of the search topic by formulating the query consistent with the federation topics and topic hierarchy.

The use of predefined topics and topic hierarchies provides other advantages that cannot be realized in a traditional keyword based search engine. In a preferred embodiment, for example, the user can be guided in the formulation of the query by having the system present a view of the progression of the query along the hierarchy of topics. Using FIG. 2 as an example, a user is provided a graphic presentation of the tree 210 when the user selects "art" as a query; thereafter, the user progresses through the tree 210 using a keyboard, mouse, or other input device, such as a voice recognition system. As each node in the tree 210 is reached, references to the most relevant documents associated with the node are displayed, and the user is given the option of retrieving one or more of the found documents or viewing references to other, less relevant, documents found to be associated with the topic, or continuing with the search. In a preferred embodiment, the documents associated with offspring or sibling nodes are included in the collection of documents that are considered relevant to the topic. Because the topics are organized in a hierarchical form in a preferred embodiment, as the user progresses down the hierarchy, the range of relevant documents decreases, thereby improving the performance and effectiveness of the search.

Note that the above process provides ancillary advantages that are not available to conventional keyword search engines as well. For example, the presentation of the hierarchical structure provides the user an insight into how documents are organized within the system, and allows the user to adjust his or her search methods accordingly. The presentation also provides immediate feedback to the user as to whether the user's terminology is being suitably recognized by the system. In a preferred embodiment, the term-mapping-services module 340 allows the user to add words and phrases that are associated with the terms used within the system, thereby allowing for a personalized search vocabulary.

In accordance with one aspect of this invention, the query/result-services module 390 enhances the user query by formulating the query as a context-sensitive query, or view. For example, the context of the user may differ according to whether the user is at home or at an office. For example, a search for restaurants may favor business-oriented establishments when a restaurant query is submitted by the user during routine working hours, and family-oriented establishments when the query is submitted at other times. In a preferred embodiment, the query/result-services module 390 also accommodates the use of user preferences to customize the results of a search in dependence upon the particular user's preferences. As in the case of topical extraction, machine learning and other techniques are used in a preferred embodiment to provide a more effective search pattern based on the observed behavior of the user. In a copending application, "Context-Based and User-Profile Driven Information Retrieval", Ser. No. 09/104,491, filed Jun. 25, 1998 by Chandra Dharap, incorporated by reference herein, a method and apparatus are presented of enabling a user to query a database wherein the query is augmented by a history of the user's prior queries. Using the restaurant example, if a user consistently accesses French-restaurants documents after submitting a restaurant query and consistently ignores fast-food-restaurants documents, the query/result-services module 390 will give more selection weight to documents that contain a French-food topic, and less weight to documents that contain a grilled-food topic. This copending application also allows the entry of other forms of search requests, such as a drawing of a shape or pattern, a tune or rhythm representing a piece of music, and so on. Because of the use of predetermined topics in accordance with this invention, these alternative forms can be customized for each topic. For example, a server that serves a topic of electronic circuits may be customized to accept a circuit diagram as a user query, and processes that diagram to locate a sub-topic that addresses similar circuits. Alternatively, the user could point to a particular component in the circuit diagram and the server would provide a document that lists the vendors for that type of device. These and other topic specific applications will be evident to one of ordinary skill in the art in light of this invention.

In a preferred embodiment, other learning techniques are used to determine an appropriate search path for queries that can have differing meanings. For example, the word "card" could apply to greeting cards, playing cards, credit cards, printed-circuit-board cards, eccentric people, etc. In a preferred embodiment, the query/result-services module 390 chooses a particular topic corresponding to the query word based on a provided user-profile or based on common usage. If, in response to the chosen topic, the user revises the query to locate one of the other topics that could have been chosen in response to the word "card", the query/result-services module 390 will favor the selection of that other topic in response to the user's subsequent use of the word "card" in a query. These and other techniques for enhancing a user query based on experience and the use of predefined topics will be evident to one of ordinary skill in the art in view of this invention disclosure. For example, the multiple potential topics corresponding to a query may be presented to the user for selection, and the user may be provided the option of having the query/result-services module 390 always choose the selected topic in response to a similar query, or to continue to present the choices.

In a preferred embodiment, similar to the use of multiple keywords in a keyword based search system, the query/result-services module 390 also allows for the user to develop the search request using a number of concurrent topics, as well as the use of boolean and fuzzy logic terms to combine the topics. For example, a user may choose to search for documents related to the topics of government.united-states and medical-research.experimental.animal, but excluding universities-.medical. Each server that includes one or more of the selected topics communicates the document references associated with each topic to the query/result-services module 390 via the home-federation-topic/view-services module 350 and, optionally, the foreign-federation topic/view services module 360. The query/result-services module 390 formulates a set of document references for presentation to the user in dependence upon the aforementioned user-preferences and context, past experiences, combinatorial logic terms, and so on.

Note that by organizing the documents according to predefined topics and hierarchies, the time and resources required to search and locate documents that are relevant to a user quest are substantially reduced. By organizing the documents by topic, the number of irrelevant documents that are presented in response to the user query is substantially reduced. By providing context-sensitive user-queries that are transformed into the vocabulary used in the predefined topics and hierarchies, the speed with which a user is brought to an appropriate topic node is substantially improved. By dynamically adjusting the topic extraction process and the user query process via machine learning techniques, the effectiveness and efficiency of the information processing device in accordance with this invention is continually improved.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the term-mapping-services module 340 can be augmented by current and future language processing techniques, including the ability to translate to and from alternative languages. The structures presented in the figures are illustrative only, and alternative structures are within the spirit and scope of this invention. For example, the aforementioned servers in the federation can be used exclusively for document organization and retrieval, while ancillary devices are used to interact with the clients. Such alternative functional partitionings would be evident to one of ordinary skill in the art.

I claim:

1. An information processing system comprising:

a server having an associated set of server topics, a topic extractor that is configured to extract a document topic from a source document, a document selector, operably coupled to the topic extractor, that is configured to identify the source document as a selected document in dependence upon whether the document topic is a member topic of the associated set of server topics of the server, and a document router, operably coupled to the document selector, that associates the selected document to the member topic.

2. The information processing system of claim 2, wherein the server is one of a plurality of servers, each server of the plurality of servers having an associated set of server topics, the topic extractor is further configured to extract a plurality of document topics from the source document, the document selector is further configured to identify each of a plurality of member topics of the associated set of server topics of the plurality of servers that includes at least one of the plurality of document topics, and the document router is further configured to associate the selected document to said each of the plurality of member topics.

3. The information processing system of claim 1, wherein the topic extractor includes a term mapping device that transforms terms in the source document to facilitate the extraction of the document topic.

4. The information processing system of claim 1, further including:

a query service device that identifies the selected document as a found document when a search topic includes the member topic, and a document retriever, operably coupled to the query service device, that is configured to facilitate the retrieval of the found document when the search topic includes the member topic.

5. The information processing system of claim 4, wherein the query service device includes a term mapping device that determines the search topic in dependence upon a user query and a user context.

6. A method for creating a document base, comprising the steps of defining a plurality of topics, creating a data structure having respective nodes corresponding to a respective one of the plurality of topics, scanning a document for a member topic that is contained in the plurality of topics, and associating the document to the node that corresponds to the member topic.

7. The method of claim 6, further including the step of allocating a respective set of topics within the plurality of topics to a respective one of a plurality of servers.

8. The method of claim 6, further including the step of creating a translation map of terms, and wherein the step of scanning the document for the member topic includes a step of translating the document based on the translation map of terms.

9. The method of claim 6, wherein the data structure is a hierarchical data structure.

10. The method of claim 6, wherein the step of scanning the document for the member topic is dependent upon at least one prior determination of the member topic in an other document.

11. A method for enabling the identification of a document, comprising the steps of enabling a receipt of a search query, enabling a determination of a search topic based on the search query, the search topic being one of a plurality of predetermined topics, enabling a determination of a topic node of a data structure corresponding to the search topic, enabling the identification of the document based on an association of the document to the topic node.

12. The method of claim 11, wherein the step of enabling the determination of the search topic includes the step of enabling a determination of a user context, and wherein the determination of the search topic is further dependent upon the user context.

13. The method of claim 12, wherein the step of enabling the determination of the search topic includes the step of enabling a transformation of the search query based on a map of terms to facilitate the determination of the search topic.

14. The method of claim 12, wherein the data structure is a hierarchical structure, and the determination of the search topic is further dependent upon the hierarchical structure.

15. The method of claim 12, wherein the plurality of predetermined topics is allocated among a plurality of servers, the search topic being associated with one of the plurality of servers, the determination of the topic node includes a determination of said one of the plurality of servers.

16. The method of claim 12, wherein the determination of the search topic is dependent upon at least one prior determination of the search topic corresponding to an other user search query.

* * * * *

UNITED STATES PATENT AND TRADEMARK OFFICE
CERTIFICATE OF CORRECTION

| | | |
|---|---|---|
| PATENT NO. | : 6,349,307 B1 | Page 1 of 1 |
| APPLICATION NO. | : 09/221951 | |
| DATED | : February 19, 2002 | |
| INVENTOR(S) | : Cheng | |

It is certified that error appears in the above-identified patent and that said Letters Patent is hereby corrected as shown below:

ON THE TITLE PAGE

Item (75), INVENTOR, left column, after "Doreen Y.", delete "Chen" and insert --Cheng--.

Signed and Sealed this

Fifteenth Day of November, 2011

David J. Kappos
*Director of the United States Patent and Trademark Office*